United States Patent [19]

Coyle, Jr. et al.

[11] Patent Number: 4,859,827
[45] Date of Patent: Aug. 22, 1989

[54] METHOD FOR WELDING RELATIVELY SMALL PARTS

[75] Inventors: Richard J. Coyle, Jr., Lawrenceville; Jaroslav Mracek, Trenton, both of N.J.

[73] Assignee: American Telephone and Telegraph Company, New York, N.Y.

[21] Appl. No.: 259,024

[22] Filed: Oct. 17, 1988

[51] Int. Cl.⁴ .............................................. B23K 26/00
[52] U.S. Cl. ................ 219/121.64; 219/350; 219/96.15
[58] Field of Search .................. 219/121.63, 121.64; 350/96.15, 96.18, 96.21

[56] References Cited

U.S. PATENT DOCUMENTS

| | | | |
|---|---|---|---|
| 4,195,980 | 4/1980 | Sterling et al. | 65/3 |
| 4,263,495 | 4/1981 | Fujita et al. | 219/121.63 X |
| 4,350,867 | 9/1982 | Kinoshita et al. | 219/121.63 |
| 4,802,729 | 2/1989 | Rivoallan et al. | 219/121.63 X |

FOREIGN PATENT DOCUMENTS 0193793  8/1986  Japan .............................. 219/121.64

Primary Examiner—C. L. Albritton
Attorney, Agent, or Firm—Roderick B. Anderson

[57] ABSTRACT

Laser welding of an outer sleeve 14 to an inner fiber ferrule 12 is expedited by, first, machining a thinned region 18 in the outer diameter of the sleeve. After the ferrule has been inserted in the sleeve, the thinned region permits the laser to fuse through the sleeve and melt part of the ferrule, as is required for laser welding of ferrule for the sleeve. The thinned region is preferably made by using a rotary cutter to cut an axially extending slot in the outer sleeve, which permits a succession of laser welds 21 in the axial direction in the slot. In a preferred embodiment, thinned regions 18,19 are made on opposite sides of the outer sleeve, and laser welding is performed simultaneously on both sides of the sleeve so as to avoid distortions caused by thermal stress asymmetries.

10 Claims, 1 Drawing Sheet

METHOD FOR WELDING RELATIVELY SMALL PARTS

TECHNICAL FIELD

This invention relates to methods for welding relatively small parts and, more particularly, to methods for welding an outer sleeve to an optical fiber ferrule.

BACKGROUND OF THE INVENTION

Recent advances in lasers, optical components and optical fibers for transmitting information in the form of lightwaves have led to proposals for generalized lightwave communications systems. The proposed use of lightwave communication as a general alternative to telephone communications presupposes an ability to make small optical components in great volume and with great precision. One basic component for such systems would be the optical coupler for transfering information to an optical fiber and removing information from the optical fiber, as is described, for example, in the patent of DiDomenico et al. U.S. Pat. No. 4,165,496, granted Aug. 21, 1979, and assigned to Bell Telephone Laboratories, Inc. The assembly of such an optical coupler requires proper alignment and positioning of two abutting optical fibers.

Positioning of a small diameter optical fiber with respect to an optical coupler is now typically done by mounting the optical fiber in a ferrule. The ferrule is snugly fitted within a sleeve which is moved axailly to a proper position and then the ferrule is bonded to the outer sleeve. Thereafter, the sleeve is fixed to the coupler and is rotated to give the optical fiber a proper angular alignment with respect to the coupler.

Optical fiber is normally bonded within the ferrule by an epoxy, which has been found to be satisfactory. It is, however, difficult to bond the ferrule to the outer sleeve after the required axial adjustment has been made. Laser welding is the most practical method for such bonding, but it poses problems because it is not practical to use it to fuse through the entire thickness of the outer sleeve. Such welding would require undesirably high laser power, and the concomitant heat would tend to distort the elements. Thus, attempts have been made to laser bond at the interface between the sleeve and the ferrule, which is difficult because of the accurate placement of the laser beam that is required. There is, therefore, a need for a method for welding the relatively small sleeve to the optical fiber ferrule in a manner that is readily amenable to mass production.

SUMMARY OF THE INVENTION

In accordance with the invention, laser welding of an outer sleeve to an inner fiber ferrule is greatly expedited by, first, machining a thinned region in the outer diameter of the sleeve. After the ferrule has been inserted into the sleeve, the thinned region permits the laser to fuse through the sleeve and melt part of the ferrule, as is required for laser welding of the ferrule to the sleeve. As will be discussed in more detail later, the thinned region is preferably made by using a rotary cutter to cut an axially extending slot in the outer sleeve that does not extend through the entire outer sleeve. This permits a succession of laser welds in an axial direction in the slot to give dependable fusion between the ferrule and the outer sleeve. In a preferred embodiment, thinned regions are made on opposite sides of the outer sleeve and laser welding is performed simultaneously on both sides of the sleeve so as to avoid distortions caused by thermal stress asymmetries.

These and other objects, features, and advantages will be better understood from a consideration of the following detailed description taken in conjunction with the accompanying drawing.

DETAILED DESCRIPTION

Figure 1:
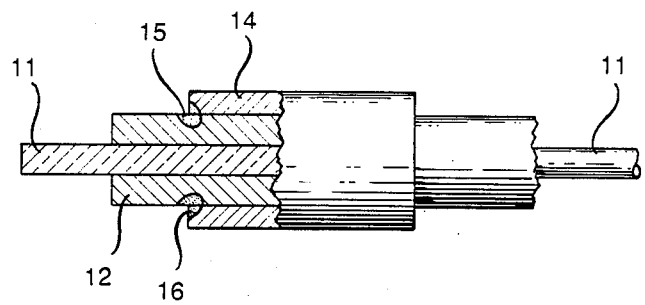
FIG. 1 is a sectional view illustrating a method for laser welding an outer sleeve to a fiber ferrule.

Referring now to FIG. 1, there is shown an optical fiber 11 mounted within a cylindrical ferrule 12. The ferrule 12 is used to permit the fiber to be attached to other elements and is typically securely bonded to the fiber with an epoxy adhesive. For the fiber to be mounted in an optical coupler, it is typically necessary to slidably mount the ferrule 12 within a metal sleeve 14. The sleeve 14 is then mounted to the coupler (not shown).

Such mounting in the coupler normally requires that the fiber be positioned or aligned properly in both the axial and the rotational directions. This can best be done by first sliding the fiber ferrule axially to a proper position within the sleeve 14 and then permanently bonding the sleeve 14 and the ferrule 12. Thereafter, the sleeve, ferrule and fiber can be rotated as a unit for proper rotational alignment. It has been found that, after axial alignment, the best method for bonding the sleeve to the ferrule is by laser welding. As described in the patent of Cruickshank et al., U.S. Pat. No. 4,733,047, granted Mar. 22, 1988, and assigned to the American Telephone and Telegraph Company, which is incorporated herein by reference, laser welding of small parts that have to be maintained in proper alignment is best done by splitting the laser beam and delivering it by two optical fibers so as to permit simultaneous welding on opposite sides of the article. In FIG. 1 laser welds 15 and 16 are simultaneously made by two laser beams delivered from a common pulsed laser.

A major problem we have encountered in making the assembly shown in FIG. 1 is the difficulty of making welds 15 and 16 so that they reliably fuse together the sleeve 14 and ferrule 12. Any slight misalignment of the laser beam will cause inadequate melting of either the sleeve or the ferrule. It is not practical to fuse through the entire thickness of sleeve 14 because the heat and power required for such operation would distort the alignment of the various elements.

Figure 2:
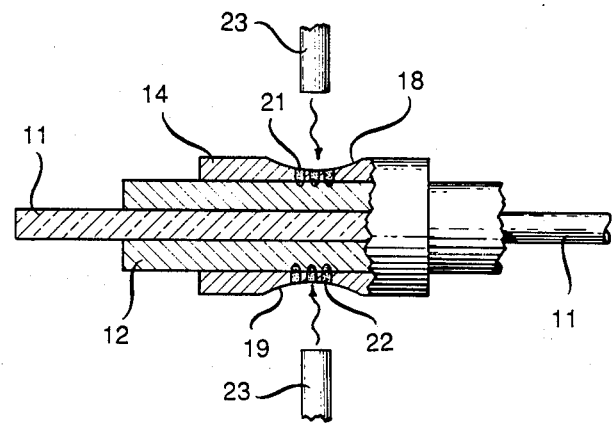
FIG. 2 is a sectional view illustrating a method for laser welding an outer sleeve to a fiber ferrule in accordance with an illustrative embodiment of the invention.

Referring to FIG. 2, in accordance with one embodiment of the invention, these problems are solved by forming thinned regions 18 and 19 on opposite sides of the annular sleeve 14. This makes it possible to form laser welds 21 and 22 on opposite sides of sleeve 14, which dependably extend through the sleeve to fuse portions of ferrule 12, as required for bonding the ferrule to the sleeve. As in FIG. 1, each of the welds 21 is made simultaneously with a weld 22 on the opposite side of the sleeve. This is preferably done by using the laser beam transmission system described in the aforementioned Cruickshank et al. patent for making simultaneous welds that produce thermal stresses that are symmetrical and thereby less likely to deform the elements. The laser beams are taken from a single laser and delivered via optical fibers 23 to the weld sites. With the thinning of the outer sleeve and with simultaneous welding in this manner, we have found that welds 21 and 22 dependably can be made with a sufficiently low power laser beam to avoid harmful thermal stresses on the elements. Further, the laser beams do not damage the fiber 11 or vaporize the epoxy adhesive, which would also be harmful to the light transmission properties of the fiber. A top view of the FIG. 2 assembly is shown in FIG. 3 which shows the three laser welds 21 within thinned portion 18.

All of the elements of FIG. 2 are dimensionally quite small: optical fiber 11 may have a diameter of 0.04 inch; the outer diameter of ferrule 12 may be 0.120 inch; the outer diameter of sleeve 14 may be 0.170 inch; the axial length of sleeve 14 may be 0.286 inch. Welds 21 and 22 may have center-to-center spacings of 25 mils (0.025 inch). Successive welds in a straight line made in this manner are quite easy to perform using known pulsed laser techniques. On the other hand, making successive welds around a circular interface as shown in FIG. 1 is technically much more difficult. The laser may typically be a neodymium: yttrium-aluminum-garnet (Nd:YAG) pulsed laser having a nominal 50 watt rating that delivers five joules per pulse to each weld site, with each pulse having a duration of five milliseconds. A single pulse gives adequate penetration under these circumstances to give a dependable weld as shown. As is known, a laser pulse delivered by an optical fiber 23 tends to give somewhat deeper penetration than would otherwise be true.

The thinned portions 18 and 19 may be made by using a rotary cutter known in the art as a Woodruff cutter having a typical radius of 0.43 inches. During cutting, the plane of the rotary cutter is parallel to the central axis of sleeve 14, making the thinned regions in the shape of slots as shown in FIG. 3. This reduces the wall thickness of the sleeve 14 typicaly from 0.025 inch to a value typically between 0.010 and 0.014 inch. Forming the thinned regions in this manner is quite convenient since it permits the sleeves 14 to be made of stock material which are then individually cut on opposite sides. Cutting in this manner has been found not to interfere with the ability to mount outer sleeve 14 within the optical coupler for subsequent rotational alignment as was described before.

Figure 3:
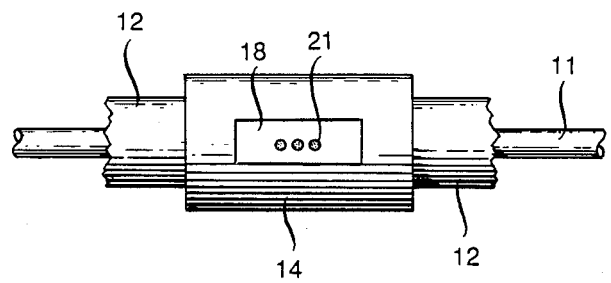
FIG. 3 is a top view of the assembly of FIG. 2.

A particular advantage of the invention as shown in FIGS. 2 and 3 is that it is amenable to mass-production techniques. That is, the thinned portions 18 and 19 can be machined automatically, and three successive welds on opposite sides can be formed automatically on a production line after axial positioning. This is an important consideration because many optical couplers would have to be mass produced in conjunction with any complex optical fiber communication system production program.

The embodiments shown are intended to be merely descriptive of the principles of the inventive concept. While the invention was stimulated by a need to fix optical fiber ferrules to outer sleeves, the disclosed technique may be used in any environment in which laser welding is needed to fix together relatively small parts. Various other embodiments and modifications may be made by those skilled in the art without depending from the spirit and scope of the invention.

We claim:

1. A method for assembling optical apparatus comprising the steps of: mounting an optical fiber ferrule within a metal sleeve; orienting the ferrule within the sleeve to attain a desired orientation of the optical fiber with respect to the sleeve; and using a laser beam to weld permanently the ferrule to the sleeve, characterized in that:

prior to the mounting, a portion of the sleeve is made significantly thinner than the remainder of the sleeve; and the welding step comprises the step of directing the laser beam at the thinned portion of the sleeve.

2. The method of claim 1 further characterized in that:

the step of making a portion of the sleeve significantly thinner comprises the step of using a rotary cutter to cut at least one slot in the metal sleeve.

3. The method of claim 1 further characterized in that:

prior to the mounting, two diametrically opposite portions of the sleeve are made thinner than the remainder of the sleeve; and the welding step comprises the step of simultaneously directing laser beams at both thinned portions of the sleeve.

4. The method of claim 3 further characterized in that:

in each of the opposite thinned portion of the sleeve, a plurality of welds are made along a line substantially parallel to the sleeve.

5. The method of claim 4 further characterized in that:

a rotary cutter is used to cut the sleeve to make each of the two thinned portions; and during such cutting operation, the rotary cutter has a plane that is parallel to the center axis of the sleeve.

6. A method for laser welding a first relatively small element to a second relatively small element characterized by the steps of:

machining a portion of the second element so as to make such portion thinner than the remaining part of the second element; overlapping the thinned portion of the second element over the first element; and using a laser beam to melt through the second element and to melt part of the first element so as to cause fusion between the first and second elements.

7. The method of claim 6 further characterized in that: the first element has a cylindrical outer surface; and the second element is an outer sleeve that contains snugly the first element.

8. The method of claim 7 further characterized in that: the thinned portion of the outer sleeve is made by cutting an axially extending slot in the outer sleeve, the slot extending through only a portion of the thickness of the outer sleeve.

9. The method of claim 8 further characterized in that:

slots are made on diametrically opposite sides of the sleeve; and the welding step comprises a step of simultaneously directing laser beams at both thinned portions of the sleeve.

10. The method of claim 9 further characterized in that:

in each slot a plurality of welds are made along a line substantially parallel to the axis of the sleeve.

* * * * *